United States Patent [19]

Bartl et al.

[11] Patent Number: 4,922,799

[45] Date of Patent: May 8, 1990

[54] APPARATUS FOR SUSPENDING, STRAPPING, AND LAUNCHING A FLYING BODY FROM A CARRIER

[75] Inventors: Josef Bartl; Wilhelm Schroettle; Dietmar Puttinger, all of Munich, Fed. Rep. of Germany

[73] Assignee: Messerschmitt-Boelkow-Blohm GmbH, Munich, Fed. Rep. of Germany

[21] Appl. No.: 353,387

[22] Filed: May 2, 1989

[30] Foreign Application Priority Data

May 3, 1988 [DE] Fed. Rep. of Germany ....... 3815022

[51] Int. Cl.5 .................... F41F 7/00; B64D 1/02
[52] U.S. Cl. .................... 89/1.819; 89/1.58; 89/1.806; 244/137.4
[58] Field of Search .................. 89/1.819, 1.806, 1.58, 89/1.53; 244/137.4

[56] References Cited

U.S. PATENT DOCUMENTS

| 2,416,028 | 2/1947 | Sloan | 89/1.58 |
|---|---|---|---|
| 2,623,437 | 12/1952 | Foster | 89/1.58 |
| 2,830,841 | 4/1958 | Benson et al. | 89/1.58 |
| 3,040,629 | 6/1962 | Duncan et al. | 89/1.819 |
| 3,954,233 | 5/1976 | Hasguemoph et al. | 89/1.58 |
| 4,049,222 | 9/1977 | Peterson | 244/137.4 |
| 4,050,656 | 9/1977 | Peterson | 89/1.58 |
| 4,183,480 | 1/1980 | Jabobowski | 89/1.58 |
| 4,313,582 | 2/1982 | Hasguenoph et al. | 244/137.4 |
| 4,660,456 | 4/1987 | Griffin et al. | 89/1.819 |
| 4,711,151 | 12/1987 | Griffin et al. | 89/1.805 |

Primary Examiner—David H. Brown
Attorney, Agent, or Firm—W. G. Fasse; D. H. Kane, Jr.

[57] ABSTRACT

A flying body, such as a missile, is strapped to a carrier vehicle, such as an aircraft, by a strapping or locking mechanism mounted in a housing which also includes components for suspending and launching the flying body from launching rails forming part of the housing connected to the carrier aircraft. The strapping is accomplished with two strapping bridges which are pressed down onto the respective suspension block elements resting on the launching rail. The pressing down force is applied by a toggle lever arrangement, one of which is provided for each strapping bridge. The toggle lever arrangement cooperates with a respective spring arrangement which keeps the corresponding toggle levers in a strapping position until the spring arrangement is released through release pawls operated with a reverse magnet. A retaining mechanism which is effective between the release of the strapping mechanism and the actual launching after ignition of the propulsion system of the flying body, is made ready for launching. In this state of readiness the retaining mechanism holds the flying body in place until its propulsion thrust is large enough to overcome the retaining force.

15 Claims, 8 Drawing Sheets

APPARATUS FOR SUSPENDING, STRAPPING, AND LAUNCHING A FLYING BODY FROM A CARRIER

CROSS-REFERENCE TO RELATED APPLICATION

This disclosure is related to U.S. Ser. No.: 07/346,890, filed on the same date namely, May 2, 1989, as the present application and entitled: RAIL LAUNCHER FOR SUSPENDING AND LAUNCHING DIFFERENT TYPES OF FLYING BODIES FROM A CARRIER.

FIELD OF THE INVENTION

The invention relates to an apparatus for suspending, strapping or locking, and launching a flying body from a carrier vehicle, such as an aircraft. Such flying bodies are equipped with their own propulsion system for propelling the flying body first along a starting rail and then along the individual flight path. The flying body can be a missile, rocket, supply container, or the like.

BACKGROUND INFORMATION

Conventional devices of the type mentioned above strap or lock the flying body to the starting rail by means of a wedge. Strapping or locking devices employing a wedge are subject to the disadvantage that in response to dynamical loads the wedge may become seized or jammed so that it is very difficult to release the wedge again. The wedge forces of a seized wedge actually hinder the launching of the flying body and it takes substantial forces to overcome these wedging forces. In devices that perform a locking operation directly from above the forces required for such operations and the forces for releasing the strapping or locking must be very substantial.

U.S. Pat. No. 4,711,151 (Griffin et al.) illustrates a missile launcher of the type mentioned above. Spring loaded so-called snubbers (29 and 30) o the body of the launcher engage hooks (25, 26) of the flying body. Each snubber (29, 30) has a cam-shape which is wedged against the respective hook by the force of its spring. It is this wedging action that is objectionable because it tends to seize or jam the snubber, especially when the structure is subject to dynamic loads. As a result, it is frequently difficult to release the seized or jammed snubbers. Making the spring forces smaller in an effort to reduce the likelihood of jamming is unsatisfactory because there would be no assurance that the missile is safely held in place until launching, since there may not be a sufficient retaining force. The known launcher also has a separate rail lock (21, 22) which is independent of the snubbers and requires for its locking and unlocking an operation separate from the operation of the snubbers. The ignition mechanism is also independent and requires its own individual operation.

OBJECTS OF THE INVENTION

In view of the above it is the aim of the invention to achieve the following objects singly or in combination:

to provide a mechanism for suspending a flying body from guide and launching rails attached to a carrier vehicle, wherein the forces needed to cause the strapping or locking forces and to cause the unstrapping or unlocking shall be relatively small;

to provide a mechanism of the above mentioned type which is safe and reliable in its operation without causing any wedging action;

to apply the strapping or locking forces by means of a spring loaded toggle lever system that is safely releasable by a magnetic force;

to assure a safe holding or retaining of the flying body between the release of the strapping and the actual launching, without interfering with the proper launching or discharging of the flying body from the carrier vehicle; and to integrate the structural features for performing a sequence of steps needed for a strapping and launching operation in a single integral unit, wherein these steps take place automatically in response to operation of an electromagnet.

SUMMARY OF THE INVENTION

The mechanism for suspending, strapping or locking, and launching a flying body from starting rails secured to a carrier vehicle is characterized in that two strapping or locking bridges are provided for securing the flying body to a pair of starting rails. The two strapping or locking bridges are pressed down by means of two toggle lever systems held in their toggling position by respective spring arrangements. The toggling position is the strapping position. A safety mechanism including safety pawls or latches, secures the spring arrangement. The release of the spring arrangement is accomplished by releasing the toggle levers through an electromagnet which is effective on the safety pawls or latches. A retaining mechanism which is effective between the unlocking or unstrapping and the actual launching, is simultaneously prepared for firing. The prepared retaining mechanism keeps the flying body in its position until it is started or launched when the propulsion thrust exceeds the retaining force.

More specifically, relatively small spring forces can hold the toggling levers in their toggling or strapping position due to the force amplification by the toggling action which presses down the strapping bridges onto the T-type suspender block of the flying body or missile to thereby lock the T-type suspender block to the launching rail. The springs are held in place by the above mentioned pawls. The electromagnet for releasing the springs can be a simple solenoid which simultaneously unlatches or releases the safety mechanism. Thus, an integral structural unit is provided in which the necessary functions are performed automatically in response to energizing or de-energizing the solenoid.

It is the main advantage of the invention that the strapping or locking force is applied to the strapping or locking bridges by means of a spring biased toggle lever system, because the force required for releasing the toggle lever system is relatively small, yet the toggle lever system remains safely locked in the absence of such small release force. Further, the release force may be applied by a magnetically actuated pawl or latch which is simple in its structure and function while simultaneously having a fail-safe characteristic. This type of mechanism avoids substantially any frictional forces that may impede the launching after the strapping mechanism has been unlocked. The frictional forces in the present arrangement can be minimized as compared to conventional starting mechanisms.

The retaining mechanism is adjustable in its retaining force and assures a safe retaining of the flying body until its launching, whereby the starting or launching thrust can safely overcome the retaining forces to make sure that retaining pawls are tilted out of the way by simple mechanical lever translations and that ignition connections are simultaneously activated by similarly simple mechanical functions.

Further advantages of the invention are seen in the following features. The invention avoids the problems of the prior art by avoiding a wedging action in the operation of the present strapping mechanism. The present mechanism is so constructed that the strapping function, the release function, the retaining function up to launching, the safety function, and the release of the safety function are all integrated into one sequence of automatically performed operations that can safely be performed by relatively small forces. By applying the strapping force through a spring loaded toggle lever system the invention avoids a wedging action yet accomplishes a strong strapping force due to the nature of the toggle lever system which can be effectively released by a relatively small force. All the above mentioned functions including the strapping, the release, the retaining, the safe securing of the missile till launching, and the release of the safety are all integrated into one structural unit which is easily triggered into performing an enforced sequence of fail-safe steps for a launching operation by the simple energizing of an electromagnet. Frictional forces are substantially avoided by the compression forces exerted by the toggle levers on the strapping bridges. Once the strapping pressure has been released there are no frictional forces effective between the suspension member and the strapping bridges so that the launching can proceed without any hindrance. The adjustable retaining mechanism assures a safe retaining of the missile until actual launching when the missile's own engine has developed a thrust sufficient for safely overcoming the retaining forces, whereby simple mechanical lever translations tilt or pull retaining pawls and ignition connections out of the way.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
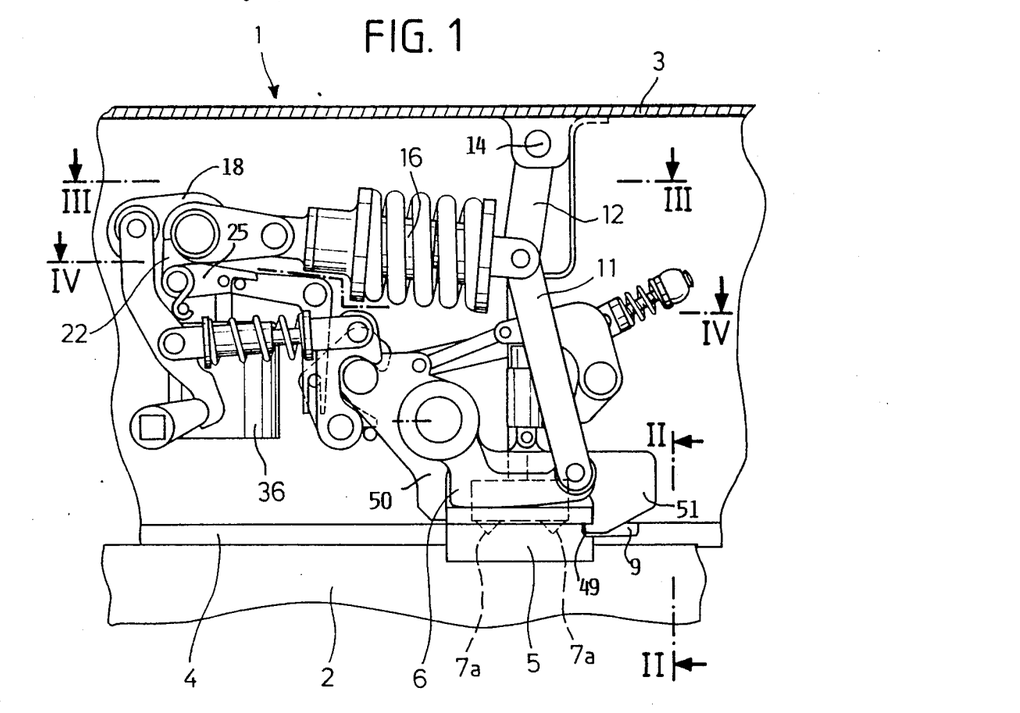
FIG. 1 shows a side view of an apparatus for suspending and strapping a flying body to a housing shown in section, wherein the housing is secured to a carrier not shown.
Figure 2:
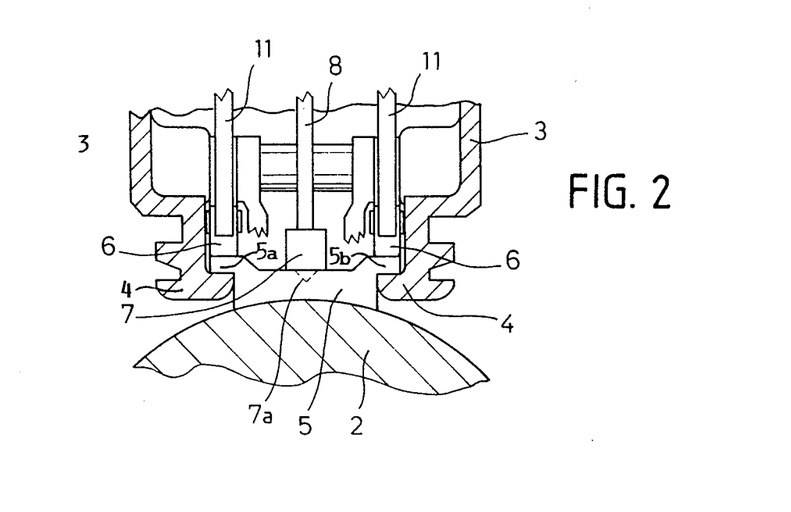
FIG. 2 is a sectional view along section line II—II in FIG. 1.

Referring to FIG. 1, the present apparatus 1 for strapping a flying body 2 is mounted in a housing 3 which in turn is secured to a carrier such as an aircraft not shown. FIG. 1 shows a side view, whereby the front portion of the housing 3 is removed. A starting or launching rail means comprising two rail members 4 forms the lower portion of the housing 3 as best seen in FIG. 2. The flying body 2 is suspended from the rail members 4 by means of a suspender block 5 having an approximately T-sectional configuration also as best seen in FIG. 2. After ignition of the propulsion system of the flying body 2, the suspension block 5 slides down the rail members 4 with the T-arms 5a and 5b gliding on the rail members 4.

FIG. 2 shows how the suspension block 5 rests with its T-arms 5a and 5b on the upwardly facing surfaces of the rail members 4. Two strapping bridges 6 press down onto the T-arms 5a and 5b. Each strapping bridge 6 is biased downwardly into its strapping or locking position shown in FIGS. 2 and 5 by means of respective spring arrangements 16 effective through corresponding toggle levers 11 and 12 shown in FIG. 1. An ignition member 7 liftable by a lifting rod 8 normally rests on the top surface of the suspension block 5. The ignition member 7 has two contact operating projections 7a which, in the positions shown in FIGS. 1 and 2, keep ignition contacts, not shown, open. When the member 7 is lifted by the rod 8, the ignition contacts are closed to ignite the propulsion system of the flying body 2. The function of the just mentioned components and also of the components shown in FIGS. 3 and 4 will be described in more detail below with reference to FIGS. 5 to 10.

Figure 3:
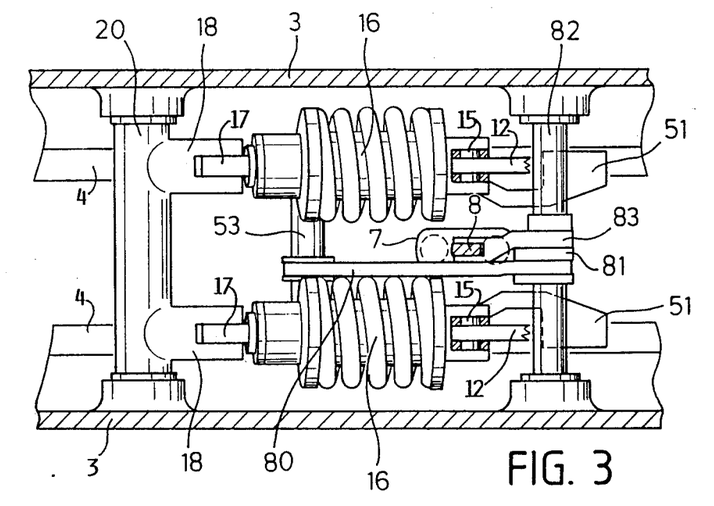
FIG. 3 is a top view with the housing sectioned along section line III—III as shown in FIG. 1 so that the upper housing portion is removed.
Figure 4:
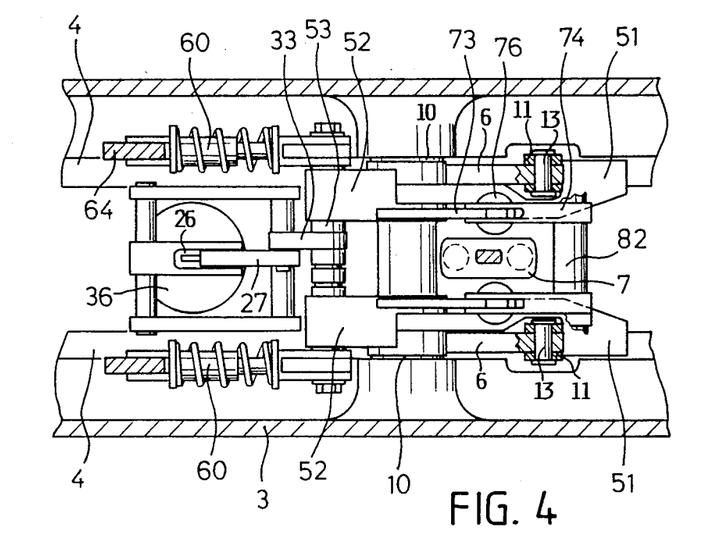
FIG. 4 is a view similar to that of FIG. 3, however, along a section plane IV—IV in FIG. 1.

FIG. 3 shows a top view in the direction toward the viewing plane defined by the arrows III—III in FIG. 1. FIG. 4 shows a sectional view along the section plane IV—IV in FIG. 1. In order not to obscure the overall view, certain components have been omitted in FIGS. 3 and 4. However, these components are shown in FIGS. 5 to 10.

Figure 5:
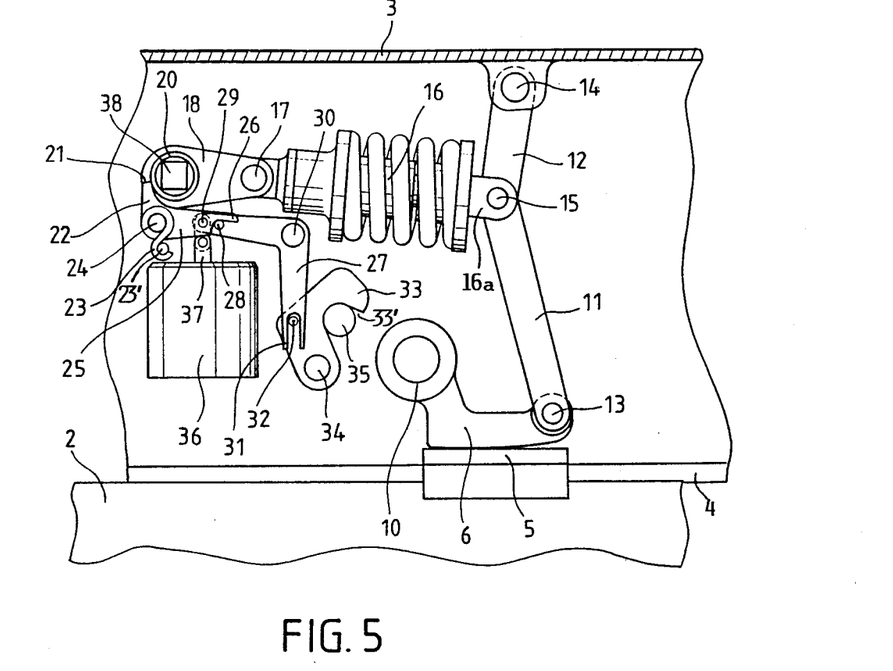
FIG. 5 is a view similar to that of FIG. 1, emphasizing the components which lock the strapping mechanism into the shown effective strapping position.

In each of FIGS. 5 to 10 only those components are shown which are essential for the particular function to be described. Thus, FIG. 5 shows primarily the components shown for strapping down or locking the strapping mechanism to the launching rail members 4. Further, FIG. 5 shows the strapping mechanism in its locked down state. Thus, FIG. 5 shows the same state as FIGS. 1 and 2.

Each strapping bridge 6 is mounted for a tilting movement on a shaft 10 which in turn is operatively supported in the housing 3 as shown in FIG. 4. The strapping bridge mechanism has two members 6 each of which is pressed down onto its respective suspension block arm 5a, 5b by the respective toggle lever rods 11 and 12. The lower end of the toggle lever arm 11 is journalled to its strapping bridge 6 by a journal pin 13. The upper end of the toggle lever arm 12 is journalled to the housing 3 by a journal pin 14. The upper end of the arm 11 and the lower end of the arm 12 are pivoted to an operating member 16a of a spring arrangement 16 by a journal pin 15. Only one set of components is being described since these sets are duplicates of each other as best seen in FIG. 3. The spring arrangements 16 as such are known and each comprises a helical spring with a telescoping guide. The left-hand end of each spring arrangement is pivoted by a journal pin 17 to a respective lever arm 18 secured to a shaft 20 operatively mounted in the housing 3 as best see in FIG. 3.

Each lever 18 is provided with a recess forming a shoulder 21 engaged by a locking pawl 22. The pawls 22 are journalled on a pawl shaft 24 and each pawl 22 is biased by its respective torsion spring 23 into engagement with the shoulder 21. Each torsion spring 23 is anchored to the housing at 23'. A lever 25 is operatively mounted on the pawl shaft 24 between the two pawls 22. The lever 25 has a free end forming a fork 26 cooperating with an engagement pin 28 at the free end of one arm of a bell crank type lever 27 which is journalled to a journal axis 30. The fork 26 rests on the pin or two pins 28, please see also FIG. 4. The bell crank type lever 27 is journalled by a journal pin 29 to the lever 25. The downwardly reaching arm of the bell crank type lever 27 is provided with a fork 31 engaging a pin 32 of a safety lever 33. The safety lever 33 is journalled on a shaft 34 and is provided with a recess 33' engaging a shaft 35 mounted in the housing 3. The shaft 35 forms part of a retaining mechanism to be described below in more detail with reference to FIGS. 7 to 10.

FIG. 5 further shows a reversing magnet 36 operating a push rod 37 pivoted at its upper end to the pivot 29 and thus to the lever 25 and to the bell crank lever 27. When the flying body 2 has been secured to the starting rail 4, the state shown in FIG. 5 is achieved by pressing the toggle lever arms 11 and 12 toward the right by turning the lever arm 18 clockwise with the aid of a square end key inserted into a square hole 38 in the shaft 20 to which the lever arm 18 is rigidly secured. This clockwise turning of the lever arm 18 compresses or cocks the springs in both spring arrangements 16.

Figure 6:
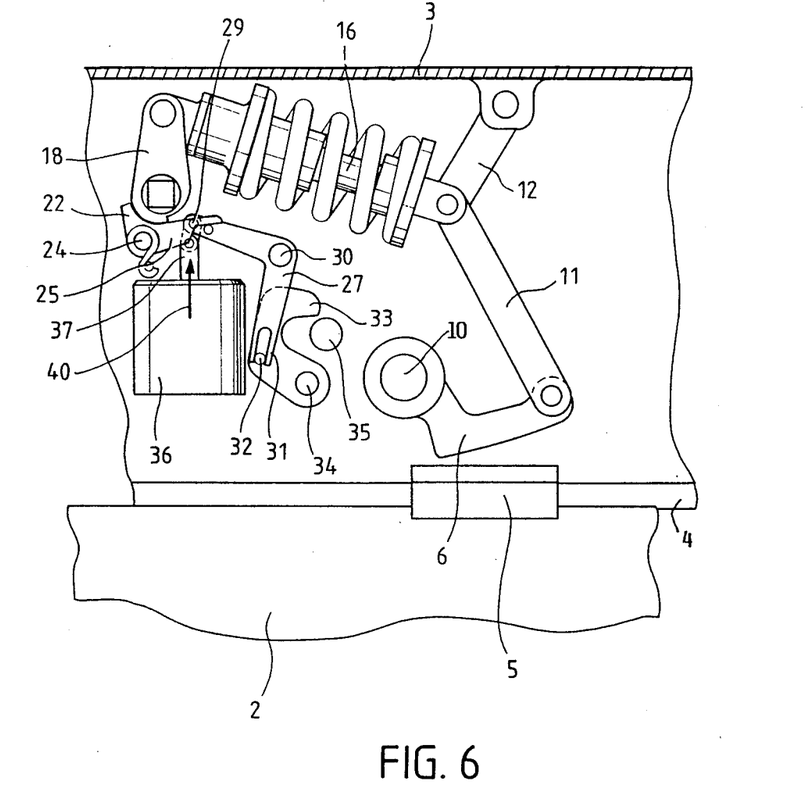
FIG. 6 is a view similar to that of FIG. 5, however, showing the strapping components in an unlocked condition.

FIG. 6 illustrates the release or unlocking of the strapping mechanism by lifting the strapping bridges 6 off the suspension block 5. For this purpose the reversing magnet 36 has been energized by connecting its solenoid coil to an electric power source. The armature of the magnet 36 has pushed the push rod 37 upwardly in the direction of the arrow 40. As a result, the lever 25 is turned counterclockwise while the lever 27 is turned clockwise. The counterclockwise rotation of the lever 25 disengages the pawls 22 from the shoulders 21 of the levers 18, whereby the cocked springs of the spring mechanisms 16 push the lever 18 counterclockwise and thus remove the pressure from the toggle lever arms 11 and 12 as shown in FIG. 6. As a result, the respective pawl 22 rests against the outer surface of the corresponding lever 18. On the other hand, clockwise rotation of the lever 27 disengages the safety lever 33 from the shaft 35. This disengagement is accomplished because the fork 31 engages the pin 32 of the safety lever 33, whereby the latter is rotated counterclockwise about its journal 34 when the lever 27 is rotated clockwise. After the flying body 2 has been launched, the push rod 37 connected to the armature of the magnet 36, is pulled back again into the starting position shown in FIG. 5. As a result, the strapping bridges 6 are lifted off the suspension block 5 of the flying body 2 so that the suspension block 5 rests freely on the rails 4. The condition of the components shown in FIG. 6 also corresponds to the situation when the flying body 2 has just been inserted onto the rails 4 prior to the strapping operation.

Figure 7:
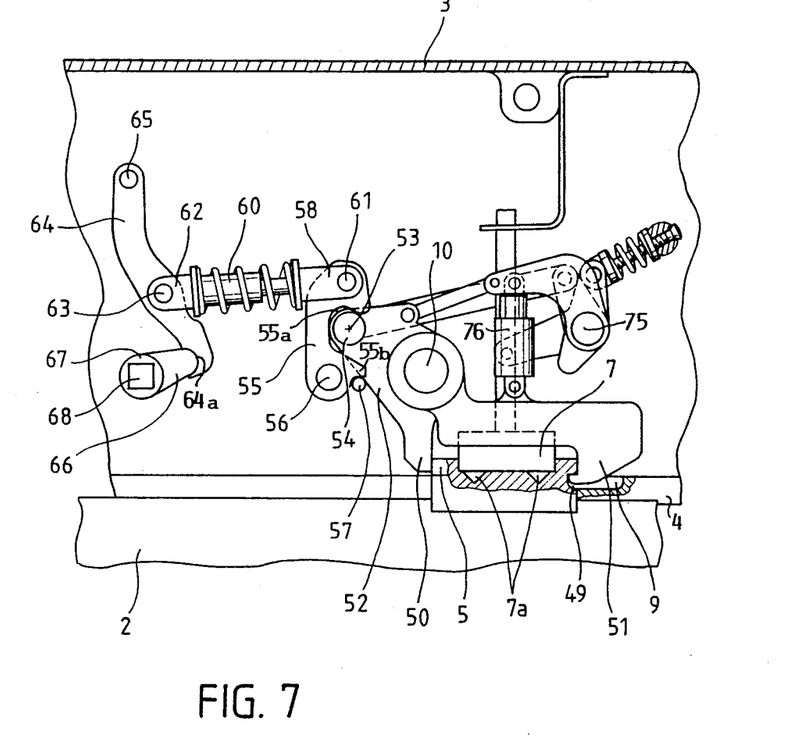
FIG. 7 is a view similar to that of FIG. 1, but emphasizing the components of the retaining mechanism which holds the flying body in place after the release of the strapping mechanism just prior to launching when the apparatus is ready for the launching operation.

FIG. 7 illustrates the position of the components of the retaining mechanism for holding the flying body 2 in place after the strapping mechanism has been released and the safety lever 33 has been turned counterclockwise to release the shaft 35 as described above. The components shown in FIG. 7 forming the retaining mechanism are also operating for completely releasing the flying body for its launching after the propulsion plant of the flying body has been ignited and sufficient thrust for the launching has been developed. The retaining even against the initial thrust which is still insufficient for launching, is accomplished by holding pawls 50 and grippers 51 journalled to the shaft 10 to which the strapping bridges 6 are also secured. As shown in FIG. 4, two holding pawls 50 and two grippers 51 engage the suspension block 5 of the flying body 2, whereby the grippers 51 engage a groove 49 in the suspension block 5 by reaching through a recess 9 in the respective rail member 4. The holding pawls 50 are formed at the lower end of levers 52.

Rotatable rollers 54 are secured to the levers 52 on axles 53. The rollers 53 engage cam tracks 55a of slide levers 55 rotatable about shafts 56 bearing against stop pins 57 by means of a projection 55b. The upper end of each slide lever 55 is journalled to a fork 58 of a retaining spring mechanism 60 by means of a journal pin 61. The opposite end of the retaining spring mechanism 60 forms a fork 62 journalled by means of a journal pin 63 to a lever 64. The upper end of each lever 64 is journalled to the housing 3 by means of a journal pin 65, whereby the lever or levers 64 are turnable around the journal pin 65 for the purpose of cocking the retaining spring mechanism 60. A crank member or eccentric member 66 is mounted for an eccentric rotation about a shaft 67, whereby the eccentric end of the member 66 presses into a rounded cam surface 64a of the lever 64. The retaining spring mechanism 60 may be cocked by means of a square key that is insertable into a square hole 68 in the shaft 67. The required spring retaining force is adjustable by the just described cam arrangement cooperating with the cam surface 64a of the lever 64.

FIG. 7 further shows the ignition member 7 with its ignition contact elements 7a which either may be contact making pins for closing electrical ignition contacts by withdrawing the pins from the suspension block 5 or these elements 7a may provide an electrical contact to an ignition of the propulsion system of the flying body 2.

Figure 8:
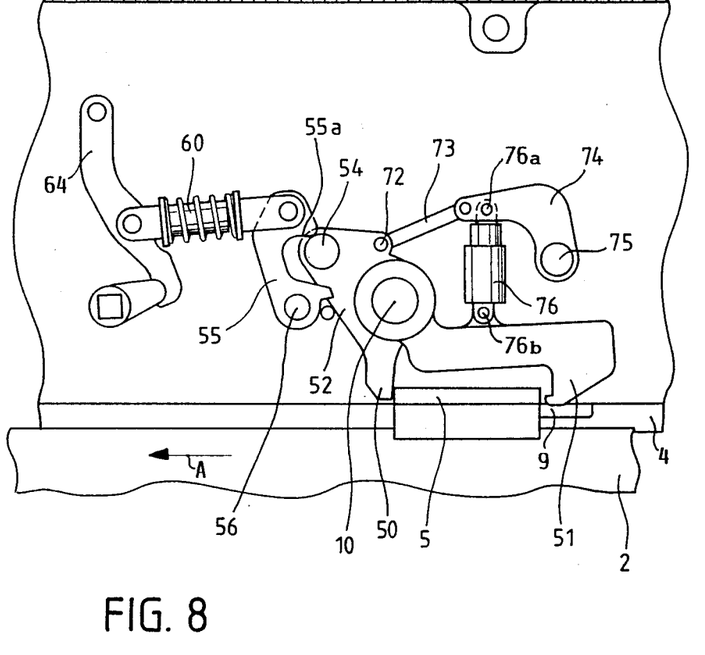
FIG. 8 is a view similar to FIG. 7, but illustrating the structural components of the retaining mechanism in a state in which a retaining safety pawl and a gripper are being released.
Figure 9:
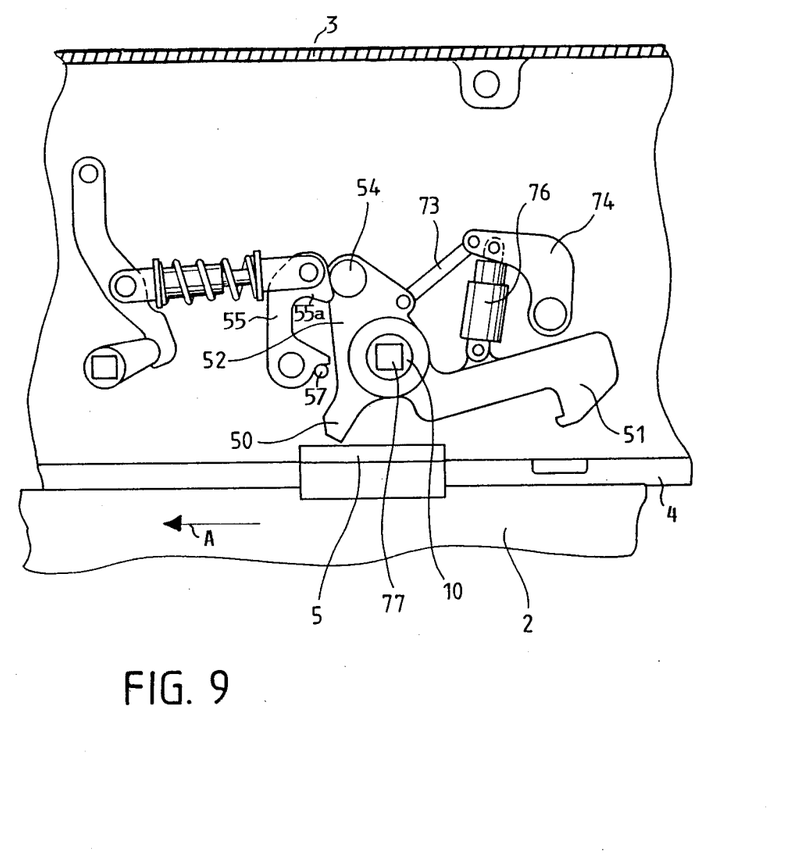
FIG. 9 illustrates the position of the retaining safety pawl and of the gripper of FIG. 8 after these components have been turned out of the path of the flying body; an FIG. 10 is a side view emphasizing the components required for lifting an ignition mechanism out of the flying body for starting the ignition of the propulsion system of the flying body.

The operation for lifting the holding pawls 50 and the grippers 51 and the operation for lifting the ignition member 7 by means of the lifting rod 8 will now be described with reference to FIGS. 8 to 10. In FIGS. 8 and 9 only those components of FIG. 7 are illustrated that are required for lifting the holding pawls 50 and th grippers 51.

In FIG. 8 the propulsion system of the flying body 2 has already developed sufficient thrust to press the suspension block 5 against the holding pawls 50. As a result, the levers 52 turn clockwise about the axis of shaft 10 and the cam rollers 54 begin to roll along the cam surfaces 55a of the slide levers 55. As a result of this movement of the rollers 54, the slide levers 55 rotate counterclockwise about the journal pin 56 to thereby compress the respective spring mechanism 60. The levers 52 are pivoted at 72 to rods 73 which in turn are connected to a one arm lever 74 journalled to the housing by a journal pin 75. Thus, the clockwise rotation of the lever 52 causes the lever 74 to also rotate clockwise about the journal pin 75. This clockwise rotation of the lever 74 lifts a spring buffer 76 which is pivoted to the lever arm 74 at 76a and to the gripper 51 at 76b. Normally, the spring buffer 76 presses the respective gripper 51 into engagement with the recess 49 in the suspension block 5 as seen in FIG. 7. However, when the spring buffer 76 is lifted, the gripper 51 is disengaged from the suspension block 5 as shown in FIG. 8.

In FIG. 9 the flying body 2 has travelled still further in the direction of the arrow A under its own propulsion. The respective leftward movement of the block 5 has pushed the holding pawl 50 further clockwise, thereby freeing the suspension block 5 completely for the unimpeded launching of the flying body 2. Under this operating condition the cam rollers 54 still engage a facing surface of the levers 55. As a result, the grippers 51 are lifted through the rods 73, the lever 74, and through the spring buffers 76 as shown in FIG. 9. The shaft 10 is provided with a square hole 77 for engagement by a respective key to again lock the retaining mechanism into the position of the components shown in FIG. 7 after a new flying body 2 has been loaded onto the launching rails 4.

Figure 10:
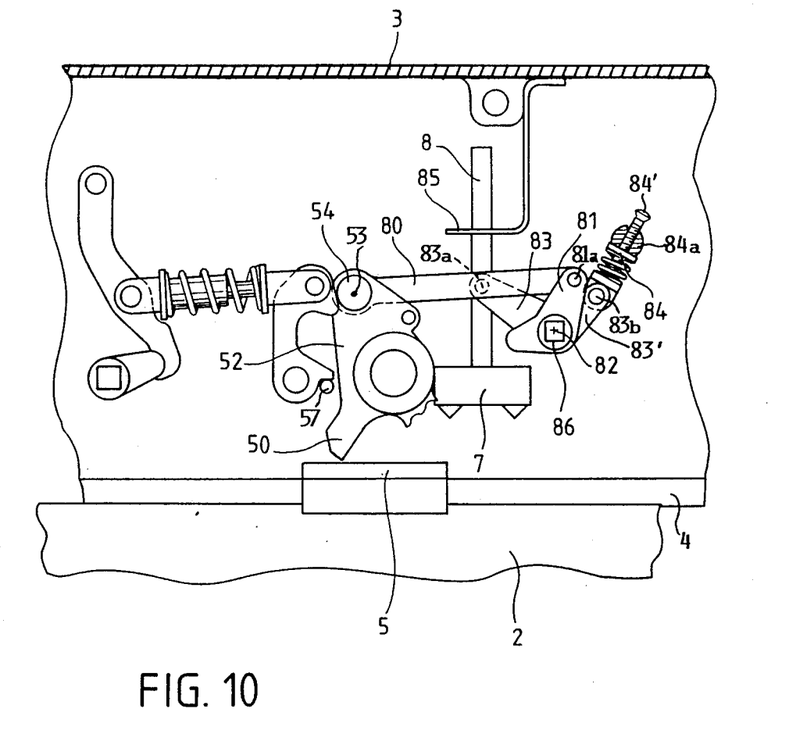

FIG. 10 shows the situation similar to that of FIG. 9, wherein the flying body 2 with its suspension block 5 has already cleared the holding pawl 50. The lever 52 has reached its end position. A connecting rod 80 is pivoted to the shaft 53 between the levers 52. The shaft 53 is shown in FIG. 7. The longitudinal axis of the shaft 53 coincides with the rotational axis of the cam rollers 54. The right-hand end of the connecting rod 80 is pivoted to a double or bell crank lever 81 at 81a. The upper end of the bell crank lever 81 may form a fork. The bell crank lever 81 is tiltable about an axis 82. A further bell crank or double arm lever 83 is also tiltable on the axis 82. The left arm of the lever 83 is pivoted at 83a to the lifting rod 8. The up and down movement of the lifting rod 8 is guided by a guide member 85 fixed to the housing 3. As mentioned above with reference to FIG. 2, the lower end of the lifting rod 8 is attached to the ignition member 7. The other arm 83' of the bell crank lever 83 is pivoted at 83b to a spring arrangement 84 which is adjustable by a screw 84' passing through a threaded hole in a rod 84a connected to the housing 3. As shown, the ignition member 7 is pulled out of the suspension block 5, or rather, out of the flying body 2 and the spring arrangement 84 is cocked beyond its dead point, whereby the end position is fixed. In order to bring the ignition pulling mechanism back into the state shown in FIG. 7 upon reloading, a square key fitting into the square hole 86 is inserted into the hole 86 and the shaft 82 with the bell crank levers 81 and 83 are turned counter-clockwise until the ignition member 7 is again inserted into a flying body.

Although the invention has been described with reference to specific example embodiments, it will be appreciated, that it is intended, to cover all modifications and equivalents within the scope of the appended claims.

What we claim is:

1. An apparatus for suspending, strapping and launching a flying body from a carrier, comprising housing means (3) including rail means (4) for suspending said flying body, strapping bridge means (6) for pressing a suspension block (5) of said flying body against said rail means, toggle lever means (11, 12) for applying a strapping pressure to said strapping bridge means, a spring mechanism (16) for normally holding said toggle lever means in a strapping pressure applying safety position, safety latch pawl means (22) arranged to normally hold said spring mechanism (16) in said safety position, electromagnet means (36) connected to unlatch said latch pawl means for releasing said strapping pressure, flying body retaining means (50, 51) for holding said flying body between said strapping pressure release and actual launching, and safety means responsive to said strapping pressure release, said safety means being operatively connected to said retaining means for preparing said retaining means for launching said flying body in response to a release of said latch pawl means.

2. The apparatus of claim 1, further comprising ignition means (7) for starting a propulsion thrust for said flying body, said ignition means being responsive to said retaining means so that said propulsion thrust becomes effective after said strapping pressure release.

3. The apparatus of claim 1, further comprising first means pivoting one end of said spring mechanism to a pivot point (15) of said toggle lever means, said safety latch pawl means comprising a journal shaft (20), lever means (18) operatively secured to said journal shaft, second means pivoting said lever means (18) to an opposite end of said spring mechanism, and shoulder means (21) arranged for normally engaging said latch pawl means (22) for holding said spring mechanism and said toggle lever means in said safety position.

4. The apparatus of claim 3, wherein said latch pawl means comprise a double lever (25) having a first arm for disengaging said latch pawl means from said shoulder means, whereby said spring mechanism (16) is uncocked, and a second arm pivotally connected to an armature (37) of said electromagnet means, said safety means comprising a further double lever (27) also pivotally connected with one arm to be operated by said armature (37), a safety lever (33) journalled in said housing, a stop shaft (35) engaged by said safety lever, and means (31, 32) operatively engaging said safety lever (33) with another arm of said further double lever (27), whereby said retaining means are released when said electromagnet means are operated.

5. The apparatus of claim 4, wherein said retaining means comprise holding pawl means (50) and gripper means (51) for engaging said suspension block substantially until launching, and operating means for said retaining means operatively connected to said holding pawl means and to said gripper means for releasing said holding pawl means and said gripper means in response to movement of said suspension block in a launching direction.

6. The apparatus of claim 5, wherein said operating means for said retaining means comprise a common shaft (10) for said holding pawl means and for said gripper means, cam levers (52) also operatively mounted on said common shaft (10), cam rollers (54) secured to said cam levers (52), retaining spring means (60) for normally pressing said holding pawl means and said gripper means toward each other so that said retaining means hold said flying body until a propulsion thrust of said flying body exceeds a force exerted by said retaining spring means, slide lever means (55) operatively connecting said holding pawl means and said gripper means to said retaining spring means through said cam rollers (54), said slide lever means (55) comprising a cam surface for engaging said cam rollers of said cam lever (52) so that movement of said cam rollers along said cam surface tilts said holding pawl means and said gripper means away from each other in response to movement of said suspension block against said holding pawl means.

7. The apparatus of claim 6, wherein said retaining means further comprise spring buffer means (76) and linkage means (73, 74) for connecting said spring buffer means to said cam levers (52), pivot means further connecting said spring buffer means to said gripper means, whereby said spring buffer means press said gripper means into a groove in said suspension block.

8. The apparatus of claim 6, wherein said operating means for said retaining means comprise a position adjustable member (64) to which one end of said retaining spring means (60) is connected, and eccentric cam means (66, 67) arranged for cooperation with a free end (64a) of said position adjustable mumber, whereby a retaining force of said retaining spring means is adjustable by rotating said eccentric cam means (66, 67).

9. The apparatus of claim 6, wherein said cam surface has such a configuration that said holding pawl means and said gripper means are held apart after said suspension block has cleared said holding pawl means, (FIG. 9) and means (77) for returning said holding pawl means and said gripper means into a flying body retaining position.

10. The apparatus of claim 7, wherein said means for returning said holding pawl means (50) and said gripper means into said retaining position comprise a tool engageable member (77) as part of said common shaft (10).

11. The apparatus of claim 6, further comprising ignition means (7) for starting a propulsion thrust for said flying body, and means for raising and lowering said ignition means in response to a launching movement of said suspension block.

12. The apparatus of claim 11, wherein said means for raising and lowering said ignition means comprise a lifting rod (8), a tiltable link rod (80) pivoted at one end to said cam levers (52) and thus to said latch pawl means (50), a first bell crank lever (81) pivoted (81a) to the other end of said link rod (80) and journalled to a shaft (82), a second bell crank lever (83) journalled to said shaft (82) and rigidly connected to said first bell crank lever (81) for movement in unison with said first bell crank lever, one arm of said second bell crank lever (83) being pivoted to said lifting rod, a damper spring arrangement (84), another arm (83') of said second bell crank lever (83) being pivoted to said damper spring arrangement, and means (86) for adjusting said shaft (82) with said levers (81, 83) back into a starting position in which said ignition means is lowered into engagement with a flying body.

13. The apparatus of claim 12, further comprising means (84') for adjusting said damper spring arrangement.

14. The apparatus of claim 12, wherein said suspension block (5) lifts said holding pawl means (50) when said suspension block travels along said rail means in a launching direction, whereby said cam rollers (54) travel along said cam surface (55a) of said slide lever means (55) under a bias of said retaining spring means (60) until a stop position (57), said gripper means being lifted into a safety position by levers (52), rods (73), lever (74), and spring buffer (76), said ignition means (7) being lifted into a safety position by levers (52), link rod (80), levers (81, 83) and the lifting rod (8).

15. The apparatus of claim 11, wherein said means for adjusting said shaft (82) back into a starting position comprise a tool engageable member (86) as part of said shaft (82).

* * * * *